United States Patent [19]

Ng

[11] Patent Number: 4,627,019
[45] Date of Patent: Dec. 2, 1986

[54] DATABASE MANAGEMENT SYSTEM FOR CONTROLLING CONCURRENT ACCESS TO A DATABASE

[75] Inventor: Fred K. Ng, Naperville, Ill.

[73] Assignee: AT&T Bell Laboratories, Murray Hill, N.J.

[21] Appl. No.: 396,425

[22] Filed: Jul. 8, 1982

[51] Int. Cl.⁴ .......................... G06F 15/40; G06F 7/00
[52] U.S. Cl. .................................................... 364/900
[58] Field of Search ... 364/200 MS File, 900 MS File

[56] References Cited

U.S. PATENT DOCUMENTS

| | | | |
|---|---|---|---|
| 3,967,248 | 6/1976 | Kjoller et al. | 340/172.5 |
| 4,130,867 | 12/1978 | Bachman et al. | 364/200 |
| 4,270,182 | 5/1981 | Asija | 364/900 |
| 4,316,245 | 2/1982 | Luu et al. | 364/200 |
| 4,399,504 | 8/1983 | Obermarck et al. | 364/200 |
| 4,476,528 | 10/1984 | Massimoto et al. | 364/200 |
| 4,480,304 | 10/1984 | Carr et al. | 364/200 |
| 4,497,039 | 1/1985 | Kitakami et al. | 364/900 |

OTHER PUBLICATIONS

Review of the Electrical Communications Laboratories, vol. 26, No. 11-12, Nov.-Dec. 1978.
"Table Update Serialization Technique", *IBM Technical Disclosure Bulletin*, C. A. Schneier, vol. 21, No. 3, Aug. 1978, (New York, US), pp. 1158-1162, see pp. 1159-1161, line 9.
"Time Sharing System Oriented Database Management System", *The Review of the Electrical Communication Laboratories*, M. Hashimoto et. al., vol. 29, Nos. 1-2, Jan.-Feb. 1981, pp. 16-31, see pp. 26 and 29.
"Database Management in a Multi-Access Environment", *Computer*, A. J. Collmeyer, published Nov., Dec. 1971, pp. 36-46, see pp. 41-42.
Y. E. Lien and P. J. Weinberger, "Consistency, Concurrency and Crash Recovery", Proceedings of the ACM SIGMOD International Conference on Management of Data, Austin, Texas, 1978.

*Primary Examiner*—James R. Hoffman
*Attorney, Agent, or Firm*—Kenneth H. Samples; Ross T. Watland

[57] ABSTRACT

A method of assuring that each of a plurality of contemporaneously active database transactions comprising at least one read transaction and at most one update transaction has a consistent view of a database storing a plurality of versions of a relation. A transaction has a consistent view of a database if the data available to a transaction are not changed during its execution. An access dictionary is stored comprising an array of access blocks each defining the database location of one of the relation versions. At any given time, only one of the relation versions is defined as current. A relation dictionary comprising an array of relation blocks is stored such that as each database transaction is begun, a relation block associated with that database transaction is stored defining the access block defining the database location of the relation version then defined as current. For the update transaction, a new access block in the access dictionary is stored defining a new database location to be used for storing a new relation version. The relation block associated with the update transaction is modified to define the new access block and the new relation version is stored in the new database location. In addition the current relation version is redefined as old and the new relation version is defined as current. Access to the database by each of the plurality of database transactions is permitted only via the relation block associated with that database transaction. The method can be extended to allow contemporaneous access by noninterfering writers and an arbitrary number of readers to a database storing a plurality of relations each having a plurality of versions.

34 Claims, 27 Drawing Figures

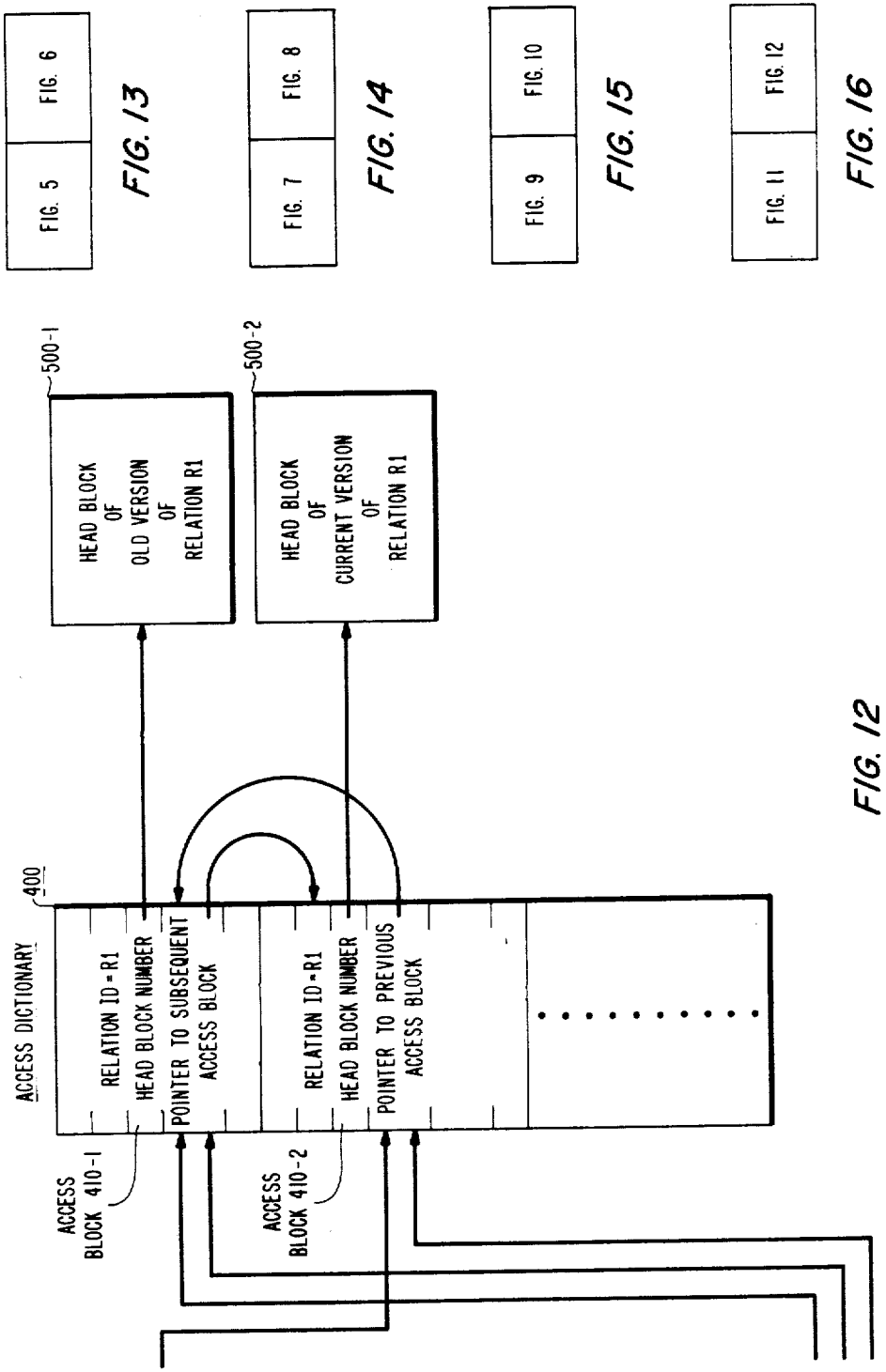

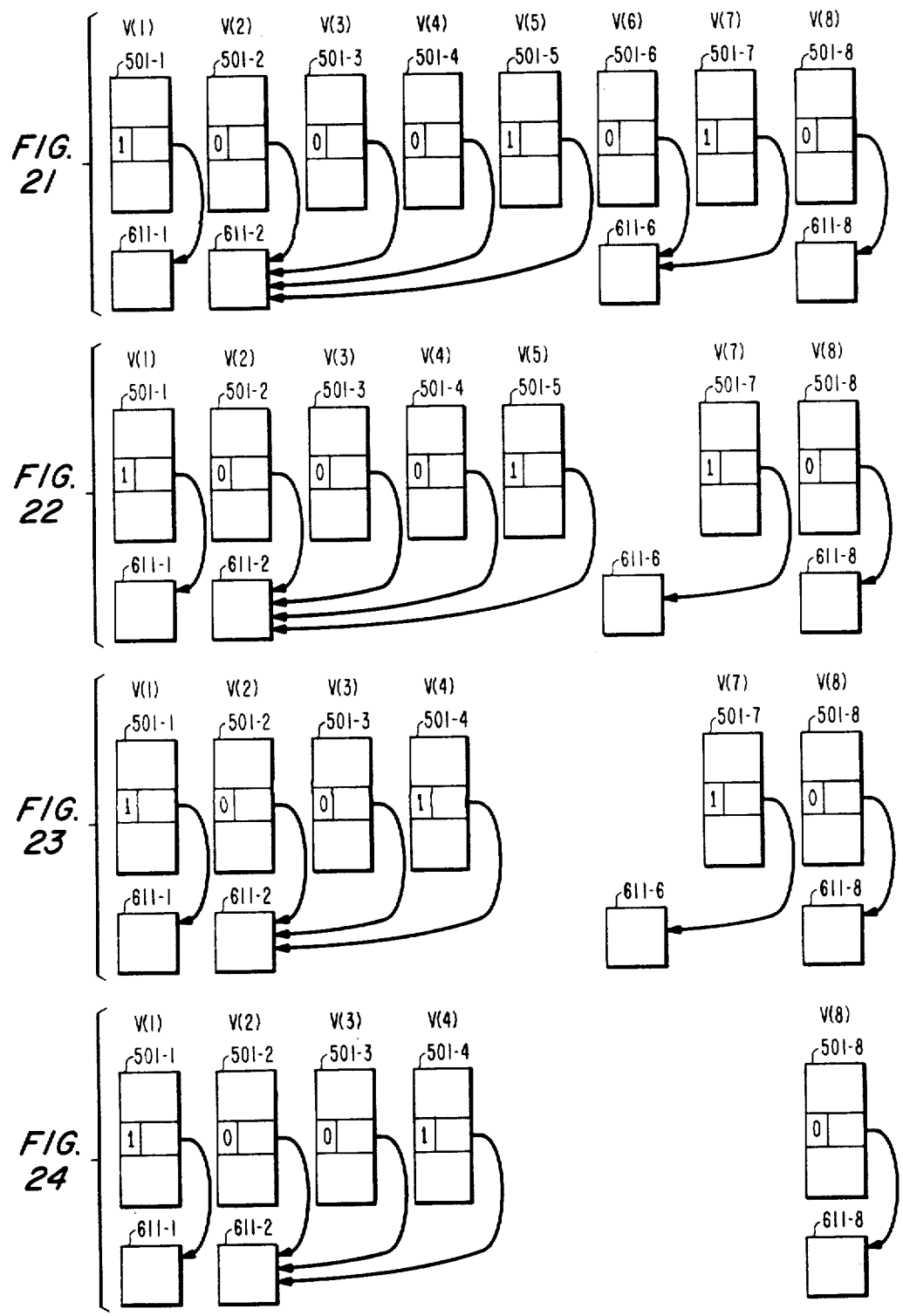

DATABASE MANAGEMENT SYSTEM FOR CONTROLLING CONCURRENT ACCESS TO A DATABASE

TECHNICAL FIELD

This invention relates to database management systems and, more particularly, to such systems allowing contemporaneous access to a database by noninterfering writers and an arbitrary number of readers.

BACKGROUND OF THE INVENTION

In order to improve the performance of database management systems it is desirable that several users be granted concurrent access to the same data. However, when concurrent access is allowed user activities must be carefully synchronized and coordinated to assure that a user reading the database will not receive inconsistent data, i.e., data that has been incompletely updated at the time of reading or data that has been updated after a reading operation is initiated. Synchronization of concurrent access is usually achieved through locking mechanisms. Coordination of contemporaneous activities is implemented by requiring all users to observe common protocols.

In one known locking mechanism, two types of locks are distinguished—read locks and write locks. A read lock protects the data being read from being changed during the read. A write lock assures exclusive access to the data. Using this locking mechanism a writer cannot be run concurrently with any other user and contemporaneous readers can share data provided there is no concurrently executing writer. This form of concurrency may be described as "several readers or one writer".

In many applications such a low degree of concurrency is unacceptable. For example, in a stored program controlled electronic switching system, rapid call completion may be dependent on the controlling program having free access to a database used to store system information such as the translation tables typically required for telephone systems. Delaying calls while a database update operation is being completed would result in an unnecessary degradation of system performance. A further disadvantage of "several readers or one writer" concurrency is the complexity of mechanisms which must be provided to detect deadlock conditions where two or more users are waiting for events which cannot happen.

A method for providing "several readers and one writer" concurrency is disclosed in a paper by Y. E. Lien and P. J. Weinberger entitled "Consistency, Concurrency and Crash Recovery," published in 1978 in the *Proceedings of the ACM SIGMOD International Conference on Management of Data*. In the disclosed method, the operations to be performed on a database are grouped into units of consistency referred to as a transaction. Each transaction has a private storage area called its work space to store copies of the entities or parts of the database accessed by that transaction. A transaction can only read data after the data is copied into the transaction's work space. The transaction can only write data into the database by first writing the data into the transaction's work space and then copying the contents of the work space into the database. Only one write transaction accessing a given entity is allowed at a time. The disclosed method also provides that the full copying of entities is not required if the database is arranged in a tree-like structure. However, in applications wherein many transactions access the same data, storing private copies of that data for each transaction represents an inefficient use of available memory resources and system real time. Further, delaying access to data being updated by a write transaction until the data is copied from work space to database adds additional complexity to the database management system to prevent access during the copying operation and, in some applications, such access delays are unacceptable. In view of the foregoing, a recognized problem in the art is implementing "several readers and one writer" controlled access to a database without adding undue complexity to the database management system and without unnecessarily burdening system resources.

SUMMARY OF THE INVENTION

The aforementioned problem is advantageously solved and a technical advance is achieved in accordance with the principles of the invention in a database management system wherein different versions of the data are stored only once for each update transaction and a set of control structures is used to associate each active database transaction with the appropriate data version.

A method in accordance with the invention controls access by each of a plurality of contemporaneously active database transactions to a data table in a database. The data table is referred to as a relation. The method includes storing a plurality of versions of the relation. The versions represent modifications of the relation resulting from previously executed database transactions and at most one of the active database transactions. A plurality of relation blocks are stored in a relation dictionary, each of the relation blocks being associated with one of the plurality of active database transactions and defining one of the plurality of relation versions. Each of the plurality of active database transactions is permitted access only to the relation version defined by the relation block associated with that database transaction.

BRIEF DESCRIPTION OF THE DRAWING

A more complete understanding of the present invention may be obtained from a consideration of the following description when read in conjunction with the drawing in which:

FIG. 17 through 27 illustrate an example of the use of a procedure known as garbage collection.

DETAILED DESCRIPTION

Figure 1:
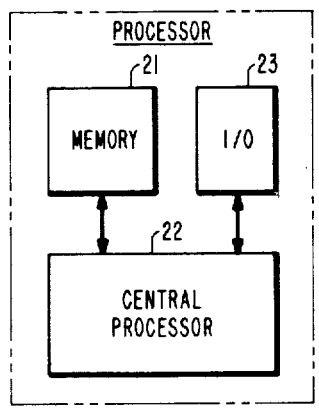
FIG. 1 is a block diagram of a processor of a program controlled system.

A program-controlled system has two types of information stored in its memory: programs and data. A program comprises a collection of basic instructions for a processor, each of which instructions directs some elemental step, so that the collection, when executed, accomplishes some broader system task or series of tasks. Data comprises information about the current status of a task, information derived from external sources and previously stored in the system, and information generated to accomplish the functional tasks of the system. Programs carry out their tasks by processing data and by controlling input/output systems in accordance with the current values of data.

In modern program-controlled systems, the basic control of the system resides in a master program, which, along with its associated data is called the operating system. The operating system directs the carrying out of system tasks by creating and invoking processes. A process is a program plus associated control data storage, called a process control block. The process control block keeps track of the context of each process including such information as the process identification, current process state, process priority, system time at process initiation, etc. Processes, in turn, accomplish their tasks by calling for the execution of a series of program functions.

Operating normally, a program-controlled system will usually have some processes that are active and some that are quiescent. A process is considered to be active during the period that it is actively executing a task, waiting for a block of time to continue its execution of a task, or waiting for input or output devices. Upon completion of a task, or set of tasks, the process assumes the quiescent state and remains in that state until initiated to execute another task or set of tasks. When a process enters a quiescent state, a minimum of data is carried over for subsequent use when the process is reinitiated. No direct program references are retained when a process becomes quiescent.

A portion of the data stored in memory may be referred to as a database. In a program-controlled electronic switching system, for example, the translation tables defining the relationship between subscriber numbers and switching equipment numbers may be stored as such a database. Processes created by the operating system access the database by means of a program called the database manager. The access may be read only access or update access depending on whether the process is required to modify the stored data. If contemporaneously active processes are allowed to access the same data, one process may read an inconsistent set of data if that data is also being updated by another process. To prevent this, process operations are grouped into units of consistency called transactions. The database manager assures that each transaction has a consistent view of the database.

Relational databases are considered to be a collection of relations, as described in C. J. Date, *An Introduction to Database Systems*, 3rd edition, Addison-Wesley, 1981. A relation can be considered as a rectangular table. Rows in the table are called tuples and columns are attributes having unique names. A named attribute in a specific tuple is referred to as an item. A key is a subset of attributes whose values are used to uniquely identify a tuple of the relation. A key is said to be composite if it consists of more than one attribute. Occasionally, a relation may have more than one candidate key. In that case, one of the candidates is designated as the primary key of the relation. Each attribute can take on a specific set of values, called the domain of the attribute. An illustrative relation named PART is shown in Table 1.

TABLE 1

| The Relation PART | | | | |
|---|---|---|---|---|
| P# | PNAME | COLOR | WEIGHT | CITY |
| P1 | Nut | Green | 13 | Amsterdam |
| P2 | Bolt | Red | 18 | Tel Aviv |
| P3 | Bolt | Blue | 18 | Rome |
| P4 | Screw | Blue | 15 | London |
| P5 | Cam | Yellow | 13 | Paris |
| P6 | Cog | Black | 20 | Rome |

The attribute P# is the primary key of the relation since specifying its value serves to uniquely identify a tuple of the relation. For example, specifying P#=P4 identifies the tuple (P4, Screw, Blue, 15, London).

In a lecture by E. F. Codd published in Vol. 25, No. 2 of the *Communications of the ACM*, February, 1982, it was indicated that "the relational model calls not only for relational structures (which can be thought of as tables), but also for a particular kind of set processing called relational processing." It was further indicated that systems having relational data structures but which do not support relational processing might be more appropriately called tabular. As used herein the terms relation and relational do not imply a requirement for relational processing, only that the data structures are relational or tabular.

FIG. 1 illustrates three major components of a program-controlled system, the central processor 22, the main memory 21, and input/output equipment 23. The central processor and its associated memory may be any of a number of modern processors well-known in the art. For example, the VAX 11/780, manufactured by the Digital Equipment Corporation, including the associated memory, is such a processor. The input/output equipment may include supplementary memory devices such as magnetic tape units and fixed or moving head disks. In the case of a telephone switching system, the input/output equipment may also include a switching network. The central processor executes processes and program functions which are stored in memory. In executing such processes and program functions, the central processor accesses and modifies data stored in the memory. The central processor executes simple steps such as the comparison of two numbers, performing a conditional branch based on such a comparison, incrementing a quantity in memory, moving quantities stored in memory from one location to another and branching unconditionally to a directly or indirectly indicated address.

An exemplary database management system for use in a program-controlled electronic switching system is described herein. In this example, the database comprising telephone translation tables is stored entirely within main memory 21. The data are stored as relations and the storage is implemented in a two-level tree-like structure. The data comprising one relation are stored in data blocks 610-1 through 610-N (FIG. 2) of memory 21 and a head block 500-2 for that relation contains index entries 510-1 through 510-N each defining the location of one of the data blocks 610-1 through 610-N.

Figure 3:
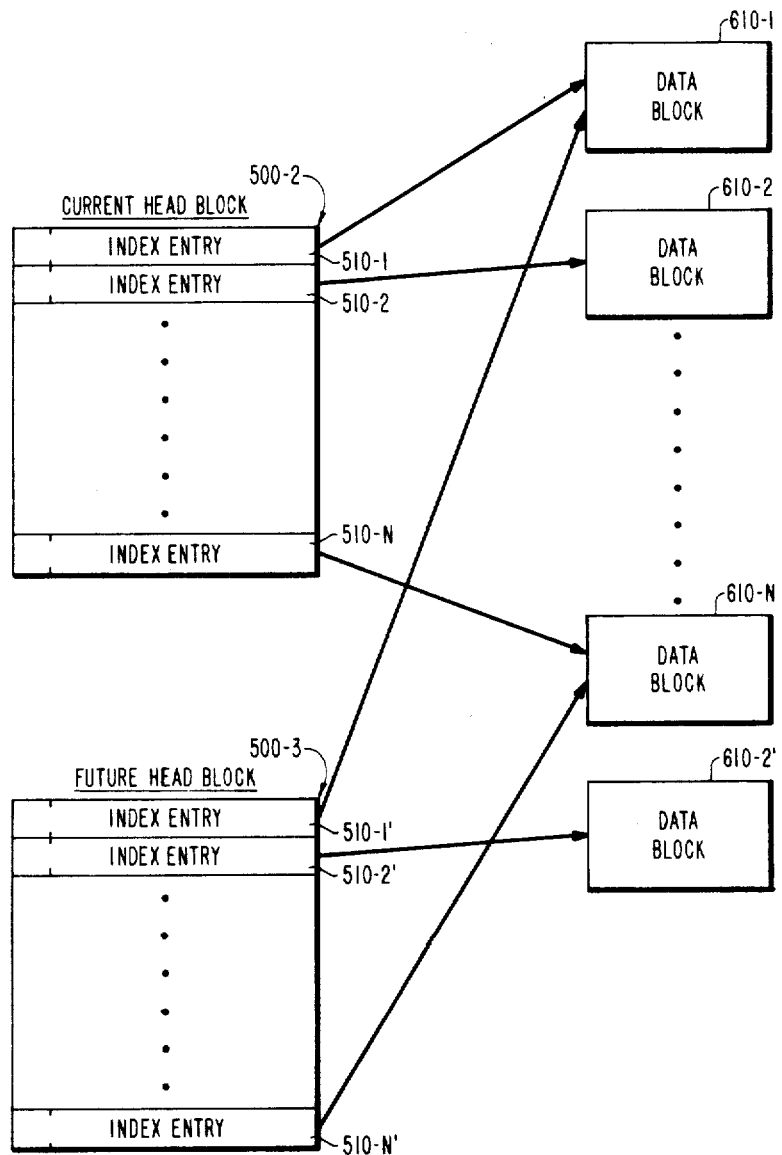
FIG. 3 illustrates the duplication of a relation to create a new relation version.

All update operations (e.g. insertion, deletion, modification) to a relation are done by first copying the relation and then updating the copy. No access to the updated copy is allowed until the update operation has been completed. The multiple copies of a relation are referred to as versions. After an update operation is completed, the updated copy is committed by designating it as the current version of the relation. Fortunately, in most cases copying the entire relation is not required. For example, consider an update operation which modifies only tuples in data block 610-2 (FIG. 3) of the relation stored in data blocks 610-1 through 610-N. Copying that relation for update requires only that the contents of data block 610-2 and head block 500-2 are copied into a new data block 610-2' and a new head block 500-3, respectively. Of the index entries 510-1' through 510-N' of head block 500-3, index entries 510-1' and 510-3' through 510-N' reference the same data blocks as the corresponding index entries 510-1 and 510-3 through 510-N of head block 500-2. Index entry 510-2' of head block 500-3 is changed to reference the new data block 610-2'.

Figure 4:
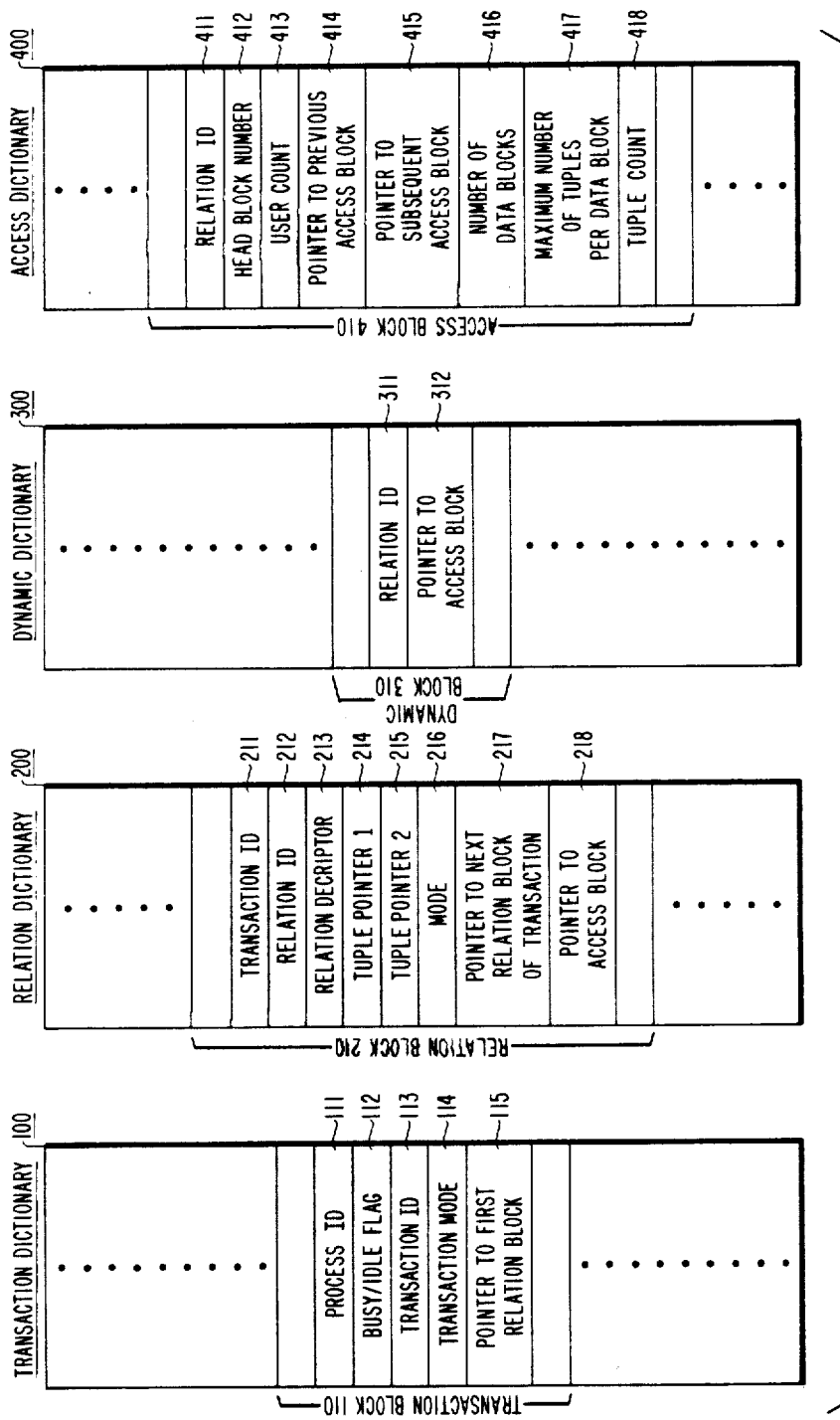
FIG. 4 illustrates a set of control structures in accordance with the invention.

Recall that a number of database transactions may be active contemporaneously and that each version of each relation has a unique head block in memory 21. As each transaction is begun it is associated with the then current version of each relation accessed by that transaction. The association is maintained by the database manager program throughout the transaction using a set of control structures in memory 21 referred to as dictionaries herein. The set of control structures comprises a transaction dictionary 100 (FIG. 4), a relation dictionary 200, a dynamic dictionary 300 and an access dictionary 400. Transaction dictionary 100 is an array of transaction blocks, one transaction block being allocated for each active database transaction. A typical transaction block, transaction block 110, is shown in FIG. 4. At location 113 of block 110, a transaction ID is stored to identify the transaction associated with block 110. A busy/idle flag stored at location 112 indicates whether the transaction block is allocated for an active transaction. A process ID, stored at location 111, identifies the process of which the transaction of block 110 is a part. The transaction mode stored at location 114 defines whether the transaction is a read only transaction or an update transaction. Each transaction may access several relations. For each relation accessed by a given transaction, a relation block in relation dictionary 200 is allocated. As will be described, the relation blocks associated with a transaction are linked together by pointers. However, the location of the first relation block for the transaction is defined by a pointer stored in location 115 of transaction block 110.

A typical relation block of relation dictionary 200, namely relation block 210, is shown in FIG. 4. Locations 211 and 212 in block 210 store respectively a transaction ID of the transaction associated with block 210 and a relation ID of the relation associated with block 210. Locations 213, 214 and 215 store a relation descriptor and two tuple pointers used, as described herein, in accessing tuples of the relation. An indicator defining whether the relation is to be updated or read is stored in location 216. Recall that a relation block is allocated for each relation accessed by a given transaction and that the transaction block of the given transaction includes a pointer to the first of these relation blocks. A pointer included in the first relation block defines the location of the second relation block for the given transaction, a pointer included in the second relation block defines the location of the third relation block, etc., so that all relation blocks for the transaction are linked together. In relation block 210, the linking pointer to the next relation block of the transaction is stored in location 217.

Recall that each version of a relation has a unique head block in memory 21. As will be described herein an access block in access dictionary 400 is allocated for each version of each relation in the database, each access block defining the head block of one relation version. Also recall that a number of relation blocks are allocated in relation dictionary 200 for a given transaction, one relation block for each accessed relation. Each relation block includes a pointer defining the location of an access block of access dictionary 400, which access block defines the location of the head block for the relation version to be accessed by the given transaction. In relation block 210, the pointer defining the location of an access block is stored in location 218.

A typical access block of access dictionary 400, namely access block 410, used to access a version of a relation is shown in FIG. 4. The relation ID of the relation is stored in location 411 of block 410. The relation version associated with access block 410 is defined by a head block number stored in location 412. A user count stored in location 413 indicates the number of active transactions which access the relation version of access block 410. This user count is used as described herein to deallocate or make available locations in memory 21 storing unused relation versions by a procedure known as garbage collection. All the versions of a given relation are linked together by means of pointers included in their associated access blocks. In access block 410 a pointer stored in location 414 defines the access block for the immediately previous (in time) version of the relation. Similarly a pointer stored in location 415 defines the access block for the next subsequent version of the relation. Locations 416, 417 and 418 store information used to obtain efficient access to tuples of the relation version of access block 410. Location 416 stores the number of data blocks of the relation version and location 417 stores the maximum number of tuples per data block. Location 418 stores a count of the total number of tuples of the relation version.

Dynamic dictionary 300 comprises an array of dynamic blocks such as dynamic block 310 (FIG. 4)—one dynamic block being allocated for each relation in the database to define the current version of that relation. Block 310 includes a relation ID stored in location 311 and a pointer stored in location 312 defining the access block of the current version. Dynamic dictionary 300 is used when the relation blocks are allocated in relation dictionary 200 at the beginning of a transaction to define the access block pointers to be stored in those relation blocks to define the then current version of each relation to be accessed by that transaction. Dynamic dictionary 300 is also used as a means of efficient database access outside of a transaction, i.e., without using transaction dictionary 100 or relation dictionary 200.

Dictionaries 100, 200, 300 and 400 are used to control database access for both read only transactions and update transactions. When a user process initiates a read only transaction, a transaction block is allocated in transaction dictionary 100. A relation block is allocated in relation dictionary 200 for each relation to be accessed by the transaction. The pointer to the access block of access dictionary 400 for the current version of each relation is copied from the dynamic block in dynamic dictionary 300 for that relation to the allocated relation block. This binds the transaction to the then current version of each accessed relation. All access to the database by the transaction is permitted only via relation dictionary 200. The versions of some of the accessed relations may become old during the course of the transaction when another transaction has changed the relations and committed the updates. However, the same versions will be associated with the transaction until the transaction is terminated such that the user process has a consistent view of the database throughout the transaction. In each access block a user count is stored representing the number of transactions actively using that access block. When a transaction is terminated, the user count of each access block used by that transaction is decremented and the transaction block and the relation blocks for the transaction are deallocated. All access blocks which do not provide access to a current relation version and which have a user count of zero are subjected to garbage collection, as described herein.

When a user process initiates an update transaction, a transaction block in transaction dictionary 100 and relation blocks in relation dictionary 200 are allocated as for a read only transaction. However, the transaction mode stored in the transaction block indicates that the transaction is an update transaction. Before a transaction block and relation blocks are allocated for a given transaction, a determination is made whether any contemporaneously active transaction is updating the same relation or relations as the given transaction. This determination is made by reading the transaction blocks and the linked relation blocks associated with each transaction block. If an interfering update transaction is found, the user process attempting to initiate the given update transaction is delayed until the interfering transaction is terminated. Accordingly, at most one update transaction is allowed to become active to access a given relation at any given time.

Figure 2:
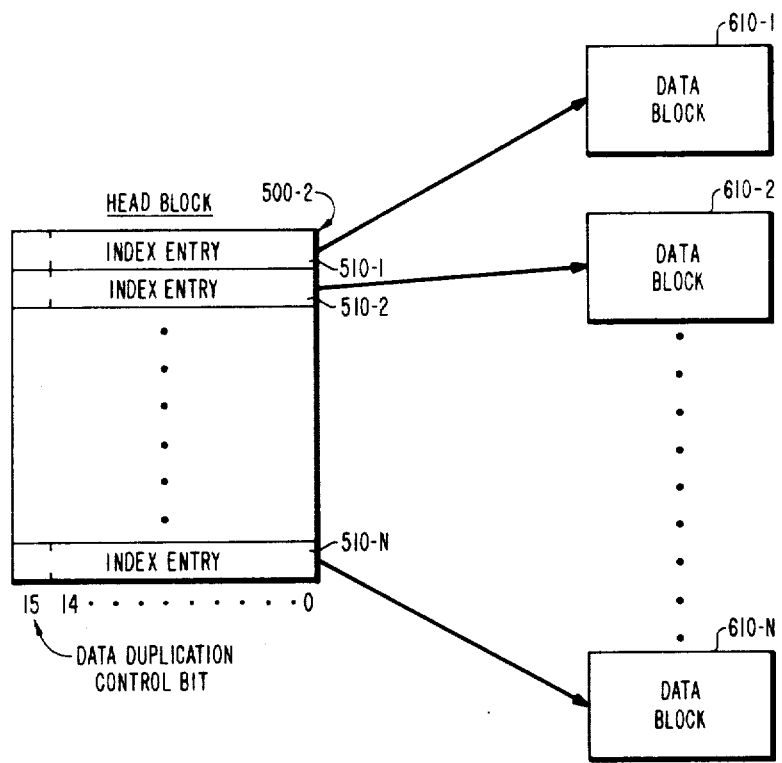
FIG. 2 illustrates a two-level, tree-like structure used for storing relations in a database.

When a relation is to be updated within an update transaction, the relation is logically duplicated. First a new head block for the relation is allocated and the index entries in the current head block as defined by dynamic dictionary 300 are copied into the new head block. Second a new access block is allocated, the contents of the current access block are copied into the new access block and the head block number of the new access block is changed from the number of the current head block to the number of the new head block. Finally the access block pointer in the relation block is changed to reference the new access block. Accordingly, access by the update transaction to the relation is thereafter limited to the duplicated copy of the relation. Recall that each relation is stored in a two-level structure comprising a single head block and a number of data blocks referenced by index entries in the head block (FIG. 2). To limit the need for additional memory, only the data blocks to be updated are duplicated. A data duplication control bit included in each index entry of a head block indicates whether the data block referenced by that index entry has been duplicated. Initially when a new head block is allocated, all the data duplication control bits are set to logic zero indicating that none of the data blocks have been duplicated. When an update is to be made to a given data block, the data duplication control bit of the index entry referencing that data block is checked. If the bit is a logic zero indicating that the given data block has not been duplicated, a new data block is allocated and the contents of the given data block are copied into the new data block. The index entry in the head block is changed to reference the new data block and the data duplication control bit of the index entry is set to logic one indicating that the referenced data block has been duplicated. Subsequent updates to the new data block within the same transaction do not result in data duplication.

When an update transaction is terminated by a user process, the updates made during the transaction are committed. The commitment of updates to relations is done by changing the references in the dynamic blocks of dynamic dictionary 400. For each updated relation, the dynamic block for that relation is modified such that the relation's new access block is referenced. Accordingly the new relation version becomes the current version and the previously current version becomes an old version. Recall that for each new data block that is allocated during the transaction, the index entry in the new head block has its data duplication control bit set to logic one. At the termination of the update transaction, these logic one data duplication control bits are transferred from the index entries in the new head block to the corresponding index entries in the previous head block. Accordingly, after the transfer takes place all the data duplication control bits in the new head block are logic zero. The old versions are subjected to garbage collection when no longer needed. At the termination of a transaction, the transaction block and the relation blocks allocated during the transaction are deallocated.

Figure 5:
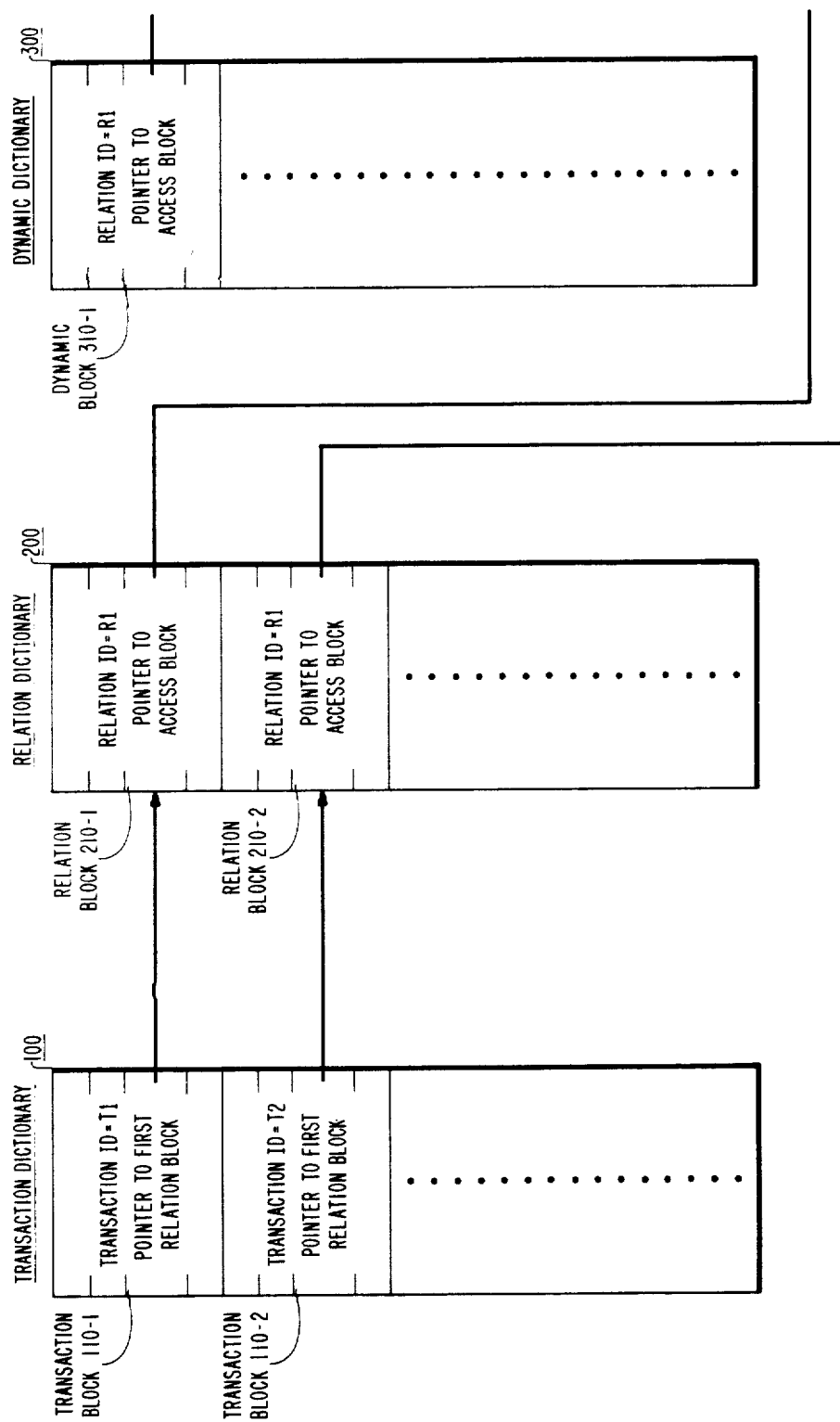
FIG. 5 and 6 (arranged in accordance with FIG. 13), FIG. 7 and 8 (arranged in accordance with FIG. 14), FIG. 9 and 10 (arranged in accordance with FIG. 15) and FIG. 11 and 12 (arranged in accordance with FIG. 16) illustrate the use of the set of control structures of FIG. 4 in an example.
Figure 6:
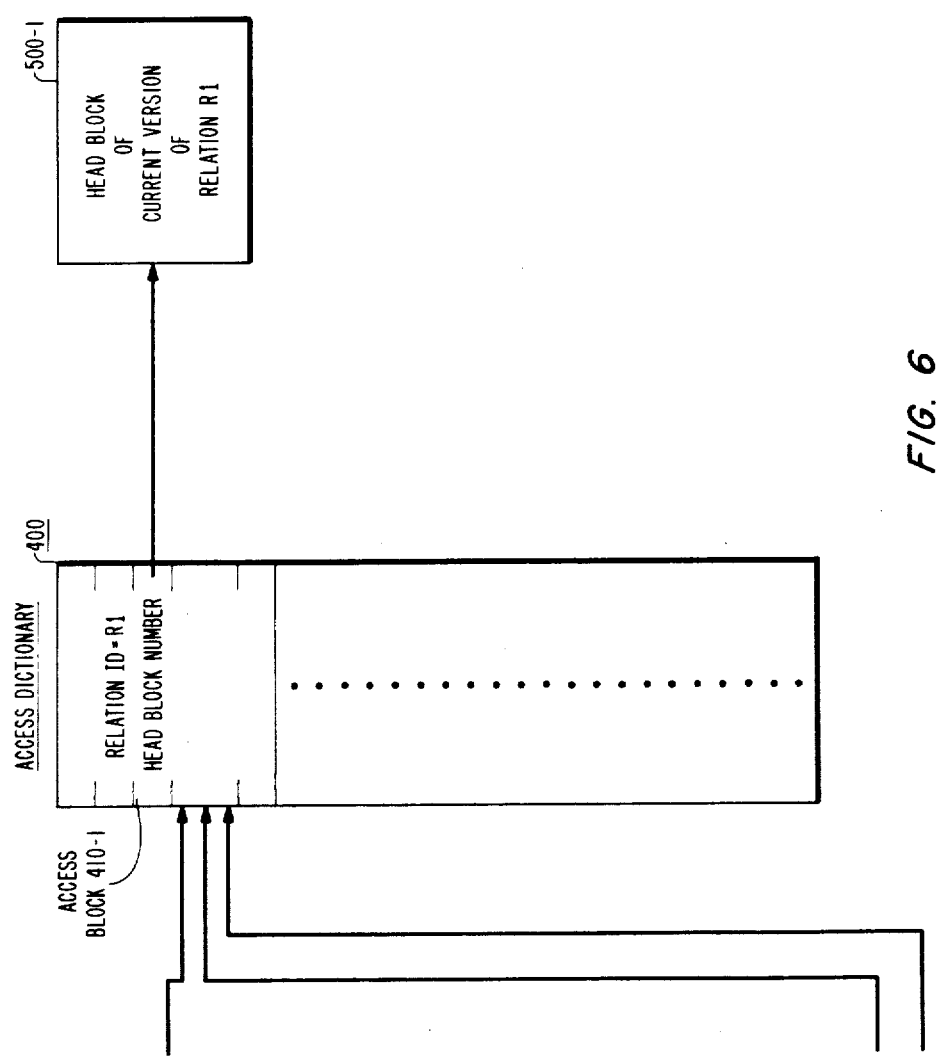

The use of dictionaries 100, 200, 300 and 400 in maintaining an association between contemporaneously active transactions and relation versions may be better understood by considering an example. Initially assume that two contemporaneously active read only transactions T1 and T2 are accessing a single version of a relation R1 (FIGS. 5 and 6 arranged in accordance with FIG. 13). Transaction blocks 110-1 and 110-2 in transaction dictionary 100 have been allocated to transactions T1 and T2 respectively. Head block 500-1 is the head block for the single version of relation R1 and access block 410-1 of access dictionary 400 defines the database location of head block 500-1. The access block pointer of dynamic block 310-1 of dynamic dictionary 300 defines access block 410-1 which in turn defines head block 500-1, the single version of relation R1 being thereby defined as the current version of relation R1. Transaction blocks 110-1 and 110-2 are associated respectively with relation blocks 210-1 and 210-2 of relation dictionary 200. Both relation blocks 210-1 and 210-2 define access block 410-1 since in accordance with the example the presently current version of relation R1 was also current at the initiation of transactions T1 and T2. Accordingly transaction T1 accesses head block 550-1 via relation block 210-1 and access block 410-1 and transaction T2 accesses head block 500-1 via relation block 210-2 and access block 410-1. User processes can access the current version of relation R1, which has head block 500-1, via dynamic block 310-1 and access block 410-1.

Figure 7:
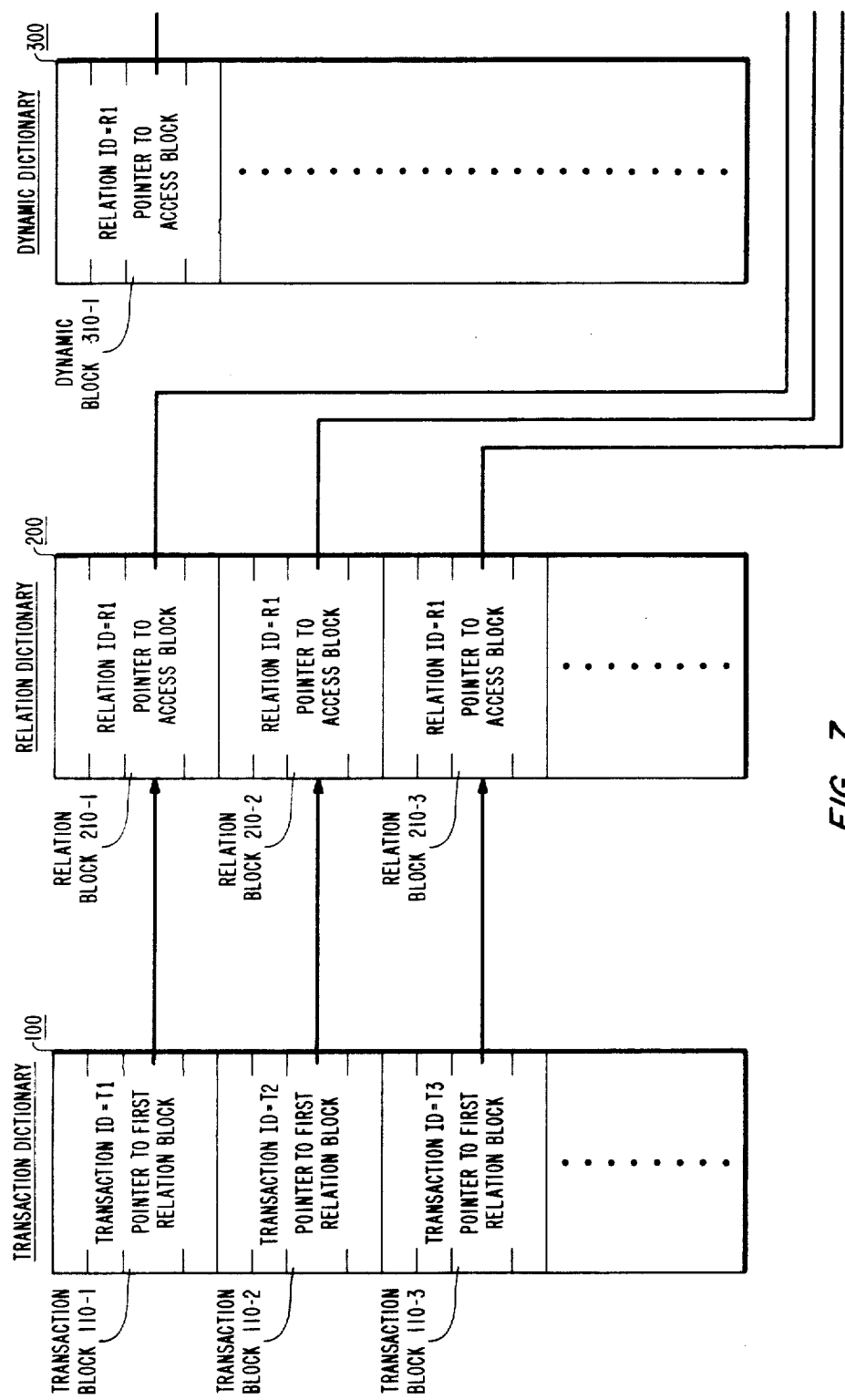
Figure 8:
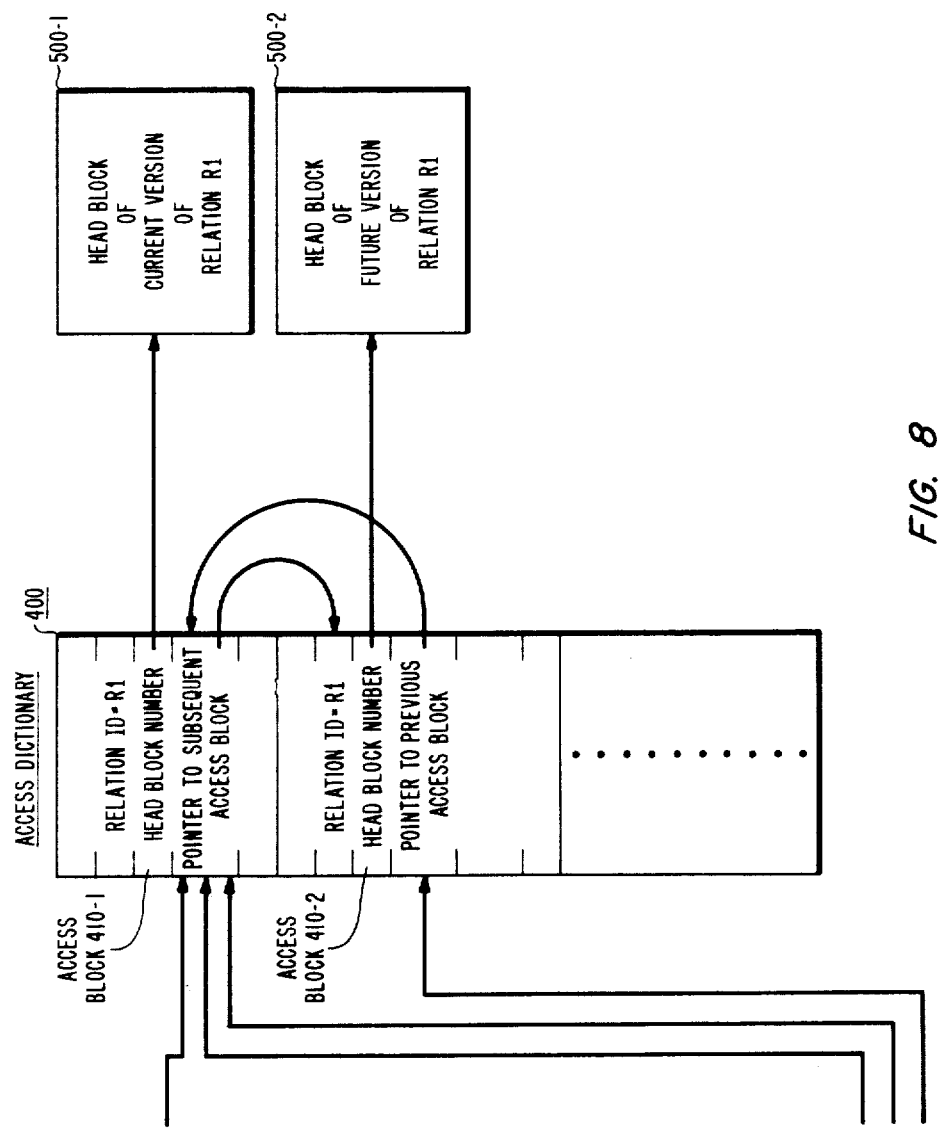

Next, consider that a user process is required to update relation R1. First a check of transaction dictionary 100 and relation dictionary 200 is made to determine whether any active transaction is presently updating relation R1. In the present example, transactions T1 and T2 are both read only transactions so a transaction block 110-3 (FIGS. 7 and 8 arranged in accordance with FIG. 14) can be allocated to the update transaction T3. A new head block 500-2 is allocated and the contents of head block 500-1 of the current version of relation R1 (as defined by dynamic block 310-1) are copied into head block 500-2. An access block 410-2 is allocated in access dictionary 400 referencing head block 500-2. A relation block 210-3 associated with transaction block 110-3 is allocated in relation dictionary 200. The access block pointer stored in relation block 210-3 references access block 410-2. Accordingly, transaction T3 accesses head block 500-2 via relation block 210-3 and access block 410-2. Transaction T3 updates relation R1 by allocating new data blocks, changing index entries in head block 500-2 and modifying the new data blocks. During the update transaction T3, the version of relation R1 having head block 500-2 is referred to as a future version and any read only transactions initiated while transaction T3 is active will obtain access to the current version of relation R1 having head block 500-1.

Figure 9:
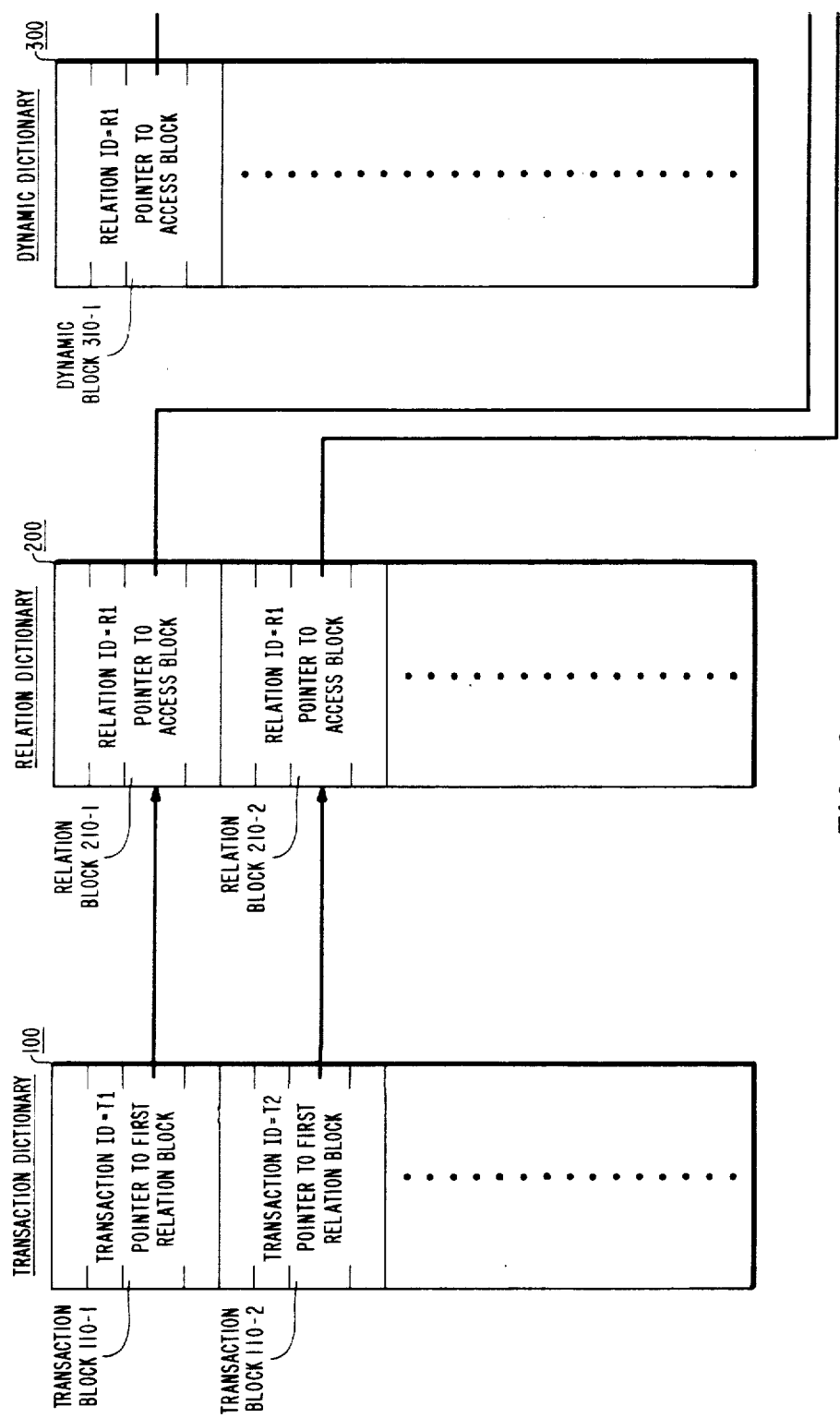
Figure 10:
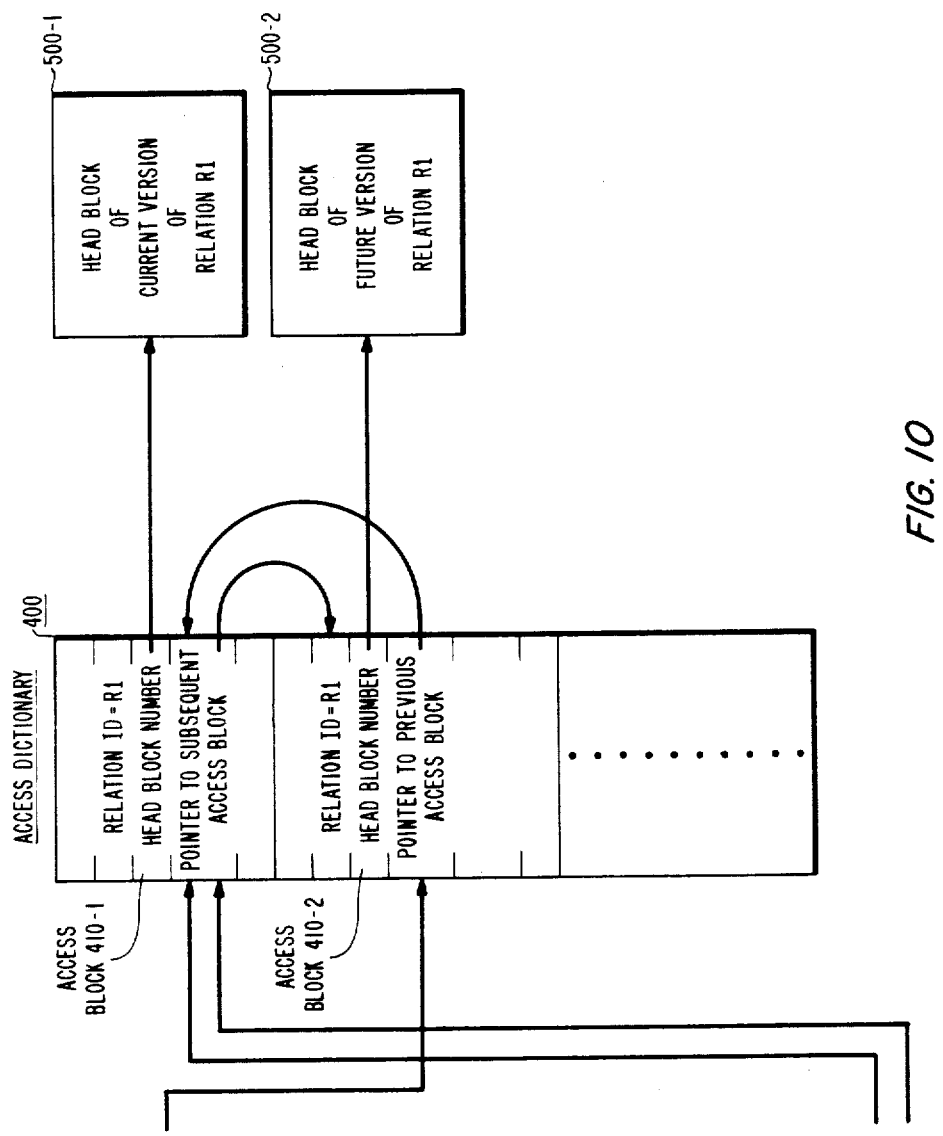

When transaction T3 is terminated the updates made therein are committed simply by changing the access block pointer of dynamic block 310-1 (FIGS. 9 and 10 arranged in accordance with FIG. 15) to reference access block 410-2. The version of relation R1 having head block 500-2 is thereby defined as the current version and the version having head block 500-1 is thereby defined as an old version. Transaction block 110-3 and relation block 210-3 are deallocated at the termination of transaction T3.

Figure 11:
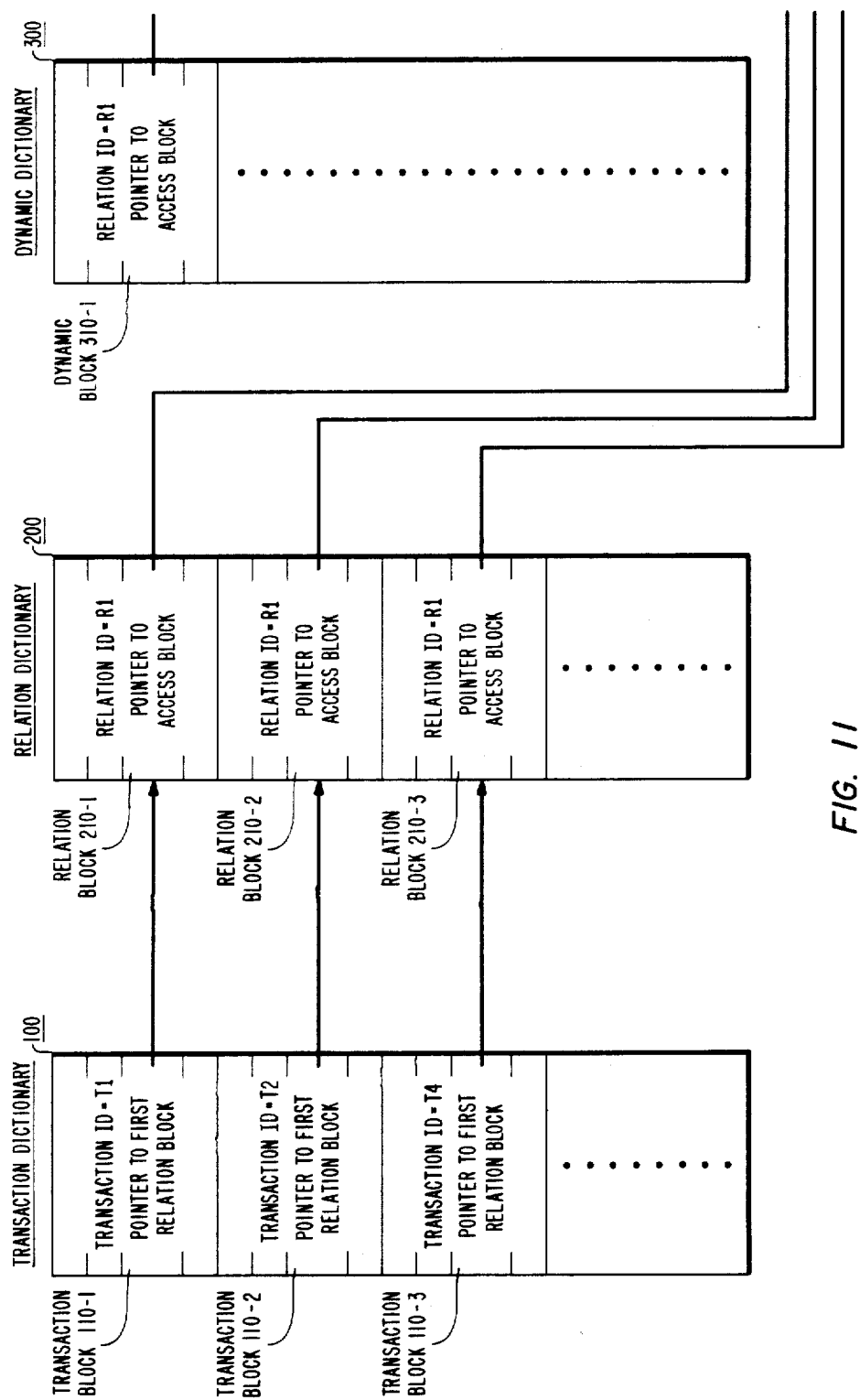

Continuing the example, another read only transaction, T4, is initiated. Transaction block 110-3 (FIGS. 11 and 12 arranged in accordance with FIG. 16) and relation block 210-3 are allocated for transaction T4. The access block pointer of dynamic block 310-1 is copied into relation block 210-3, which access block pointer defines access block 410-2. Accordingly, transaction T4 accesses the current version of relation R1 (having head block 500-2) while active transactions T1 and T2 still access the version having head block 500-1. Although the illustrative example is limited to two versions of one relation, the extension to many relations each having multiple versions is clear. Transaction dictionary 100 will have one transaction block allocated for each contemporaneously active transaction. For a given transaction, relation dictionary 200 will have one relation block for each relation accessed by that transaction. Dynamic dictionary will have one allocated dynamic block for each relation in the database. Finally, access dictionary 400 will have one allocated access block for each version of each relation.

User processes are able to access and update the database by means of low-level primitives or function calls to the database manager. These primitives allow the user to begin a transaction, close a relation, delete a tuple, end a transaction, insert a new tuple, open a relation and read and update tuples without being aware of the above-described steps required to maintain dictionaries 100, 200, 300 and 400, which steps are the responsibility of the database manager. The low-level primitives used within transactions are listed and described in Table 2.

TABLE 2

DBbgntrn (mode, numrel, rellist, tranid)
DBbgntrn specifies the start of a transaction to the database manager. A transaction represents an atomic unit of processing on the database. The mode indicates whether the transaction will be used for UPDATE or READONLY. The user must specify all the relations to be used in the transaction in the relations list (rellist) and the number of relations (numrel). The user will receive a consistent view of the database, which is not affected by any updates introduced by other concurrent processes. DBbgntrn returns a transaction identifier (tranid).
DBclorel (tranid, reldesc)

TABLE 2-continued

DBclorel closes a relation. The relation descriptor will be invalidated. If the relation is opened for update, closing the relation has the effect of aborting all the updates performed on the relation. Hence the user must not close a relation opened for update if the user wishes to commit the updates. The command DBendtrn will automatically close all relations in the transaction. DBclorel must be called inside a transaction using a transaction identifier (tranid).
DBdltup (tranid, reldesc)
DBdltup deletes the current tuple of the relation referred to by the relation descriptor (reldesc). The relation must be opened for update. DBdltup must be called inside a transaction which has an update mode using a transaction identifier (tranid).
DBendtrn (tranid, flag)
DBendtrn terminates a transaction. All open relations are automatically closed. The parameter (flag) allows the user to abort the transaction, if the transaction has an update mode. If the flag is ABORT, the transaction will be aborted (i.e., all updates performed in the transaction will not be committed). If the flag is COMMIT, all updates will be committed.
DBintup (tranid, reldesc, tup_buf)
DBintup inserts the user supplied tuple (tup_buf) into the relation. The current position of the relation descriptor (reldesc) is not relevant when the function is called. If the tuple is successfully inserted, the current position will be repositioned to the newly inserted tuple.
DBopnrel (tranid, relname, mode, reldesc)
DBopnrel opens a relation by assigning a relation descriptor to the user. The relation descriptor is used to refer to the current (tuple) position of the relation (i.e., it is used as a cursor on a relation). A relation can be opened more than once if multiple cursors are needed. In most applications, one cursor on a relation should be sufficient. The mode indicates whether the relation will be used for UPDATE or READONLY. The relation is identified by its relation name (relname). DBopnrel must be called inside a transaction using a transaction identifier. DBopnrel returns a relation descriptor (reldesc).
DBrdfst (tranid, reldesc, tup_buf, attr_name)
DBrdfst retrieves the first tuple in the relation into the tuple buffer (tup_buf). An optional feature allows the user to specify an attribute name (attr_name) for that relation. If an attribute name is specified, DBrdfst retrieves the first tuple which satisfies the attribute value pre-stored in the tuple buffer by the user. A current position on the relation is established on the tuple retrieved, which position is identified by the relation descriptor (reldesc) for subsequent references. This command must be executed within a transaction using the transaction identifier (tranid).
DBrdnxt (tranid, reldesc, tup_buf, attr_name)
DBrdnxt retrieves the next tuple of the current position of the relation into the tuple buffer (tup_buf). The current position is referred to by the relation descriptor (reldesc). An optional feature allows the user to specify an attribute name (attr_name) for that relation. If an attribute name is specified, DBrdnxt retrieves the next tuple which satisfies the attribute value pre-stored in the triple buffer by the user. The current position will be repositioned to the tuple retrieved. This command must be executed within a transaction using the transaction identifier (tranid).
DBrdtup (tranid, reldesc, tup_buf)
DBrdtup retrieves the tuple that satisfies the key value and writes that tuple into the tuple buffer (tup_buf). The key value must be inserted into the tuple buffer using the structure defined for the relation. A current position of the relation is established on the tuple retrieved, which position is identified by the relation descriptor (reldesc) for subsequent references. The command must be executed within a transaction using the transaction identifier (tranid).

TABLE 2-continued

DBuptup (tranid, reldesc, tup_buf)
DBuptup updates the current tuple of the relation, referred to by the relation descriptor (reldesc), using the user supplied tuple in the tuple buffer (tup_buf). The key value of the user supplied tuple must agree with the key value of the current tuple. The position of reldesc remains unchanged. DBuptup must be called inside a transaction using a transaction identifier (tranid).

The tuple buffer referred to in Table 2 is a process workspace. It is used both to store keys used to search for particular tuples and as temporary storage for retrieved tuples. The relation descriptor referred to in Table 2 is used as a cursor to more rapidly locate tuples in a relation or to sequentially traverse a relation. For example in an update operation when the tuple has been previously located by a key-to-address transformation, the tuple can be quickly relocated using the relation descriptor. Recall that relation block 210 (FIG. 4) stores a relation descriptor at location 213 and two tuple pointers at locations 214 and 215. If, for example, relation dictionary 200 has storage available for 100 relation blocks, the relation descriptors stored in those 100 relation blocks would be the 100 odd integers 1, 3, 5 ... 197, 199. (The 100 even integers 2, 4, 6 ... 198, 200 are used only when a second cursor is needed.) When a relation is first opened within a transaction (using DBopnrel), the relation descriptor stored in the relation block for that relation and that transaction, for example, the relation descriptor 17, becomes available to the user process. When a tuple is retrieved (for example, using DBrdtup), the location of that tuple within the relation is stored in the relation block as TUPLE POINTER 1. A subsequent reference to that tuple can be made using the relation descriptor. If two cursors are needed, the relation may be opened a second time, in which case the relation descriptor returned to the user process is one greater than that returned the first time the relation was opened. For example, if relation descriptor 17 was returned the first time the relation was opened, relation descriptor 18 would be returned the second time the relation was opened within a transaction. A reference to relation descriptor 18 would then allow the tuple defined by TUPLE POINTER 2 in the relation block to be retrieved. User processes are not allowed direct access to TUPLE POINTER 1 and TUPLE POINTER 2 to prevent users from inadvertently changing their values but rather are allowed indirect access via the relation descriptors.

Dynamic dictionary 300 is used to obtain access to the database without the delay involved in setting up a transaction. Such access is termed single command access. The access block pointers in dynamic dictionary 300 are used to read the current relation versions. Before a single command update to a relation is allowed, the transaction blocks and associated relation blocks are checked to determine whether an interfering update transaction is presently updating the same relation. If such an interfering transaction is found, the single command update is delayed until the interfering transaction is terminated. Note that user processes obtaining single command access are not guaranteed a consistent view of the database. Accordingly, such access is allowed only when the access operation can be completed in a very short time period. As referred to herein, access within a transaction refers to access via relation dictionary 200 and access outside of a transaction refers to access via dynamic dictionary 300. The low-level primitives used for single command access outside of a transaction are listed and described in Table 3.

TABLE 3

DBfdltup (relname, tup_buf)
DBfudltup deletes the tuple in the relation which has the identical key value with that given in the tuple buffer (tup_buf). The relation is identified by its relation name (relname). This command must be called outside a transaction.
DBfintup (relname, tup_buf)
DBfintup inserts the user supplied tuple (tup_buf) into the relation. The relation is identified by its relation name (relname). This command must be called outside a transaction.
DBfrdtup (relname, tup_buf)
DBfrdtup retrieves the tuple, which satisfies the key value, into the tuple buffer (tup_buf). The key value must be inserted by the user into the suple buffer using the structure defined for the relation. The relation is identified by its relation name (relname). This command must be called outside a transaction.
DBfuptup (relname, tup_buf)
DBfuptup updates the tuple in the relation, which has the identical key value with that given in the tuple buffer (tup_buf). The relation is identified by its relation name (relname). This command must be called outside a transaction.

Recall that when an update is committed at the termination of an update transaction, the logic one data duplication control bits, which are included in those index entries of the new head block that reference new data blocks allocated during the transaction, are transferred to the corresponding index entries of the previous head block. When the user count of an access block of access dictionary 400 for an old relation version (stored prior to the version presently considered current) is reduced to zero, the old version is subjected to garbage collection. Since the user count is zero, the access block and the head block for the old relation version can clearly be deallocated. However, since only the data blocks updated during a given update transaction are duplicated and accordingly data blocks may be shared by many versions, only certain data blocks referenced by a given head block can be deallocated. Therefore, before the head block is deallocated, the data duplication control bits of each index entry in the head block and each index entry in the immediately previous (in time) head block are checked to determine those data blocks which are not being shared and which can accordingly be deallocated. The garbage collection method, stated in psuedo-code, is given in Table 4.

TABLE 4 for each control bit in head block of version V(n)do {
if (control bit (V(n))=0)
continue;
if (control bit (V(n))=1) {
if (control bit (V(n−1))=1)
deallocate the data block;
else
control bit (V(n−1))=control bit (V(n));
}
}

In words, when a version V(n) is being subjected to garbage collection, the data duplication control bit of each index entry in the head block of version V(n) is tested. For index entries having logic zero data duplication control bits, the referenced data blocks are being shared and therefore cannot be deallocated. For index entries having logic one data duplication control bits, a determination of whether the referenced data blocks are being shared requires that the data duplication control bits in the head block of the immediately previous version V(n−1) also be tested. Only when the data duplication control bits of corresponding index entries in the head blocks of verions V(n) and V(n−1) are both logic one can the data block referenced by the index entry in the head block of version V(n) be deallocated. However when the data duplication control bit of an index entry in the head block of version V(n) is logic one and the data duplication control bit of the corresponding index entry in the head block version V(n−1) is logic zero, the latter control bit is changed to logic one.

Figure 17:
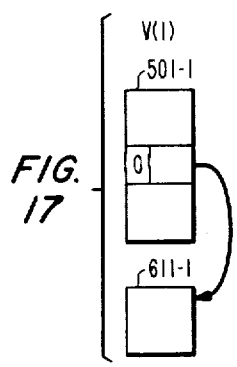
Figure 18:
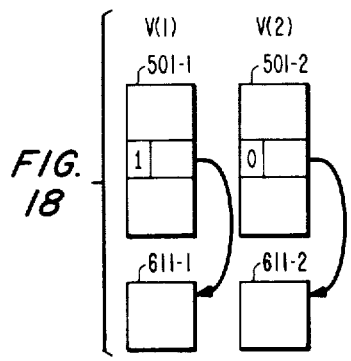
Figure 19:
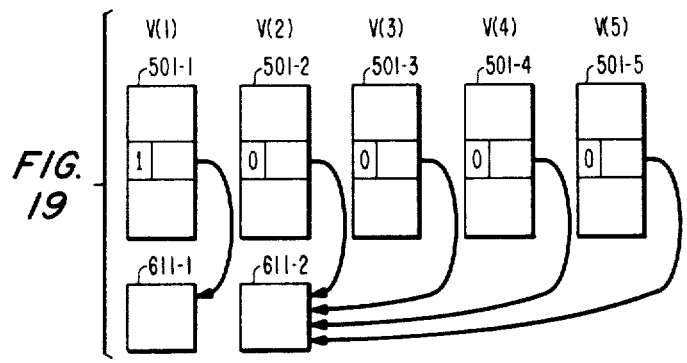
Figure 20:
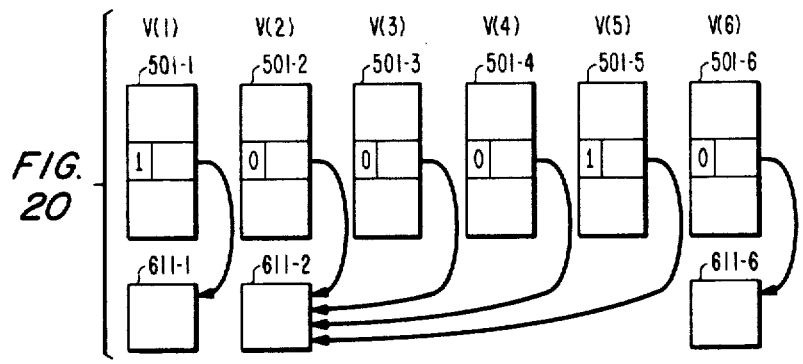

The operation of the garbage collection method may be better understood by considering the example illustrated in FIGS. 17 through 27. The example traces the steps involved in storing eight versions of a given relation and then subjecting outdated versions to garbage collection when they are no longer needed. First, consider that only one version V(1) of a given relation is stored (FIG. 17). Head block 501-1 includes a number of index entries each referencing one data block. For the present example, only one index entry and the referenced data block 611-1 are shown. The symbol "0" at the left of the index entry represents the data duplication control bit which, in this case, indicates that data block 611-1 has not been duplicated. Now consider that an update transaction requires the modification of certain tuples stored in data block 611-1. A new head block 501-2 is allocated for the new relation version V(2) and the contents of head block 501-1 are copied into head block 501-2. A new data block 611-2 is allocated, the contents of data block 611-1 are copied into data block 611-2 and the index entry in head block 501-2 is changed to reference data block 611-2. When the update transaction is terminated after the required modifications are made in data block 611-2 the data duplication control bit in the index entry of head block 501-1 is changed to logic one to indicate that data block 611-1 has been copied. FIG. 18 illustrates versions V(1) and V(2) after the update transaction has been terminated. Three subsequent update transactions modifying parts of the relation other than the part stored in data block 611-2 result in the allocation of head blocks 501-3, 501-4 and 501-5 for version V(3), V(4) and V(5), respectively. Since none of these transactions require modification of data block 611-2, the index entries in head blocks 501-3, 501-4 and 501-5 each reference data block 611-2 (FIG. 19) and the data duplication control bits of those index entries are therefore logic zeroes. However, the next update transaction does require modification of data block 611-2. A new data block 611-6 and a new head block 501-6 for version V(6) are shown in FIG. 20. Note that the data duplication control bit in the index entry of head block 501-5 for version V(5) is set to logic one indicating that data block 611-2 has been duplicated. Two subsequent update transactions result in the allocation of head blocks 501-7 and 501-8 for versions V(7) and V(8), respectively (FIG. 21). The first of the two transactions does not modify data in data block 611-6; the second transaction does. Accordingly one new data block, block 611-8, is allocated and the data duplication control bit of the index entry of head block 501-7 is set to logic one at the termination of the second of the two transactions, at which time version V(8) becomes the current version of the relation.

Figure 25:
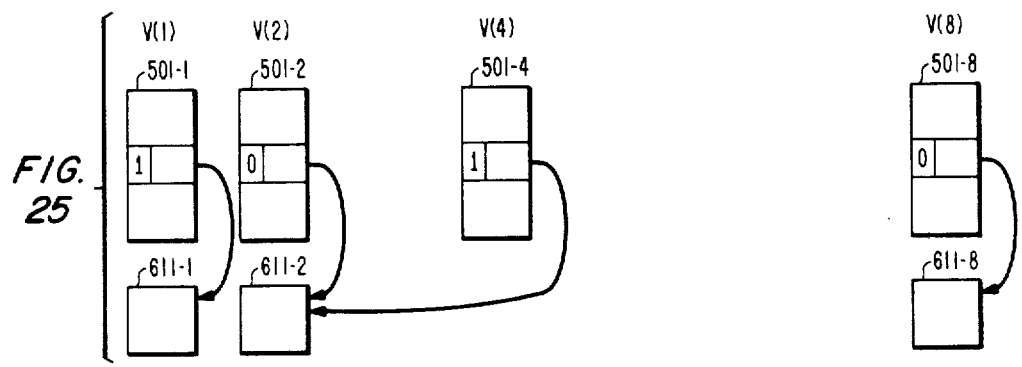
Figure 26:
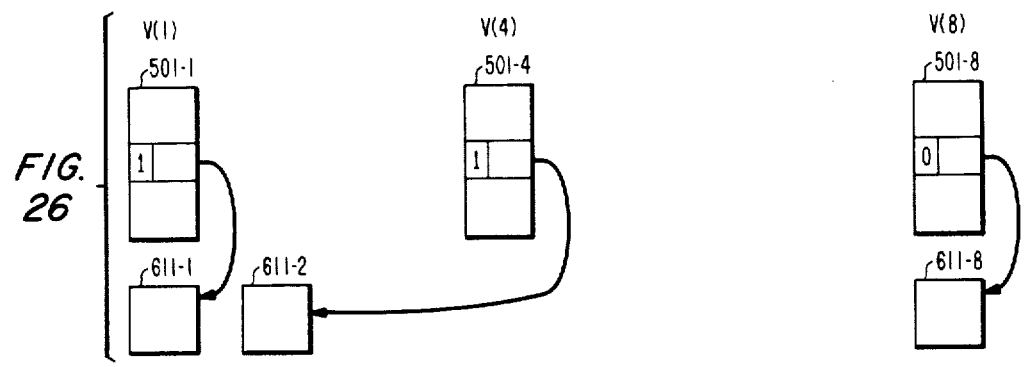
Figure 27:

Recall that a user count is stored in each of the access blocks of access dictionary 400. Assume that at the end of the step shown in FIG. 21 all eight versions V(1) through V(8) of the relation are being used as indicated by the user count not being zero in any of the eight access blocks referencing head blocks 501-1 through 501-8. Then a read only transaction, for example, that had been using version V(6) is terminated and as a result the user count for version V(6) is reduced to zero. Version V(6) is subjected to garbage collecton. Since the data duplication control bit of the index entry of head block 501-6 shown in FIG. 21 is logic zone, data block 611-6 is shared with another version and therefore is not deallocated. Although for the present example only one index entry in head block 501-6 is being considered, all index entries in a head block are tested when that block is subjected to garbage collection. After the tests have been completed, head block 501-6 is deallocated (FIG. 22). To continue the example, the user count of version V(5) becomes reduced to zero and version V(5) is subjected to garbage collection. Since the data duplication control bit of the index entry of head block 501-5 is logic one, the data duplication control bit of the corresponding index entry of the immediately previously stored (in time) allocated head block 501-4 must be tested. As used herein, the term "immediately previously stored allocated head block" refers to the latest stored of the still allocated head blocks that were stored prior to the head block of the version being subjected to garbage collection. Since the last-mentioned control bit is logic zero, the data block referenced by the index entry of head block 501-5, namely data block 611-2, is being shared and therefore data block 611-2 is not deallocated. However, the data duplication control bit of the index entry of head block 501-4 is set to logic one and head block 501-5 is deallocated (FIG. 23). Next, the user count of version V(7) becomes reduced to zero and version V(7) is subjected to garbage collection. Since the data duplication control bits of the corresponding index entries of both head blocks 501-7 and the immediately previously stored allocated head block 501-4 are logic one, data block 611-6, which is referenced by head block 501-7, is deallocated since it is not shared. Head block 501-7, is also deallocated (FIG. 24). Continuing the example, the user count of version V(3) becomes reduced to zero and version V(3) is subjected to garbage collection. Since the data duplication control bit of head block 501-3 is logic zero, referenced data block 611-2 is not deallocated and only head block 501-3 is deallocated (FIG. 25). Similarly, when the user count of version V(2) becomes reduced to zero, only head block 501-2 is deallocated (FIG. 26). When the user counts for versions V(1) and V(4) are reduced to zero, head blocks 501-1 and 501-4 and data blocks 611-1 and 611-2 are deallocated, leaving only head block 501-8 for version V(8) and data block 611-8 intact (FIG. 27). Head block 501-8 and data block 611-8 will not be deallocated as long as version V(8) is the current version. By the use of the garbage collection method of Table 4, as illustrated by this example, the amount of memory used to store outdated relation versions is kept to a minimum.

It is to be understood that the above-described embodiment is merely illustrative of the principles of the invention and that other embodiments may be devised by those skilled in the art without departing from the spirit and scope of the invention.

What is claimed is:

1. A method of controlling access by each of a plurality of contemporaneously active database transactions to a relation in a database, said method comprising the steps of storing a plurality of versions of said relation representing modifications of said relation resulting from previously executed database transactions and at most one of said plurality of active database transactions, storing in a relation dictionary a plurality of relation blocks each associated with one of said plurality of active database transactions and defining one of said plurality of relation versions and permitting access by each of said plurality of active database transactions only to the one of said plurality of relation versions by the relation block associated with that database transaction.

2. A method of controlling access by each of a plurality of contemporaneously active database transactions to a relation in a database, said method comprising the steps of storing a plurality of verions of said relation representing modifications of said relation resulting from previously executed database transactions and at most one of said plurality active database transactions, storing in an access dictionary a plurality of access blocks each defining the database location of an associated one of said plurality of relative versions, storing in a relation dictionary a plurality of relation blocks each associated with one of said plurality to active database transactions and defining one of said plurality of access blocks and permitting access by each of said plurality of active database transactions only to the one of said plurality of relation versions having its database location defined by the access block defined by the relation block associated with that database transaction.

3. A method of controlling access by each of a plurality of contemporaneously active database transactions to a relation in a database, said method comprising the steps of storing a plurality of versions of said relation representing modifications of said relation resulting from previously executed database transactions and at most one of said plurality of active database transactions, storing in an access dictionary a plurality of access blocks each defining the database location of an associated one of said plurality of relation versions, defining one of said plurality of relation versions as current, storing in a relation dictionary a plurality of relation blocks each associated with one of said plurality of active database transactions and defining one of said plurality of access blocks such that as each of said plurality of active database transactions is begun a relation block associated with that database transaction is stored defining the one of said plurality of access blocks defining the database location of the one of said plurality of relation versions then defined as current, permitting access by each of said plurality of active database transactions only to the one of said plurality of relation versions having its database location defined by the access block defined by the relation block associated with that database transaction.

4. A method in accordance with claims 1, 2, or 3 wherein said step of storing a plurality of versions of said relation comprises the steps of allocating a head block for each of said plurality of relation versions, storing each of said plurality of relation versions in at least one data block and for each of said plurality of relation versions, storing at least one index entry in the head block for that relation version, each of said index entries defining the database location of a data block storing a portion of that relation version.

5. In a program-controlled system having a database including at least one relation, a method of assuring that the data of said relation that are accessible to each of a plurality of contemporaneously active database transactions are unchanged by any transaction other than said each transaction, said plurality of transactions comprising sets of operations on said relation and comprising at most one update transaction including write access to said relation, said method comprising the steps of storing a plurality of versions of said relation, storing in an access dictionary a plurality of access blocks each defining the database location of an associated one of said plurality of relation versions, defining one of said plurality of relation versions as current, storing in a relation dictionary a plurality of relation blocks each associated with one of said plurality of database transactions and defining one of said plurality of access blocks such that as each of said plurality of database transactions is begun a relation block associated with that database transaction is stored defining the one of said plurality of access blocks defining the database location of the one of said plurality of relation versions then defined as current, permitting access to said relation in said database by each of said plurality of database transactions only via the relation block associated with that database transaction, for said at most one update transaction, storing a new access block in said access dictionary defining a new database location to be used for storing a new relation version, modifying the relation block associated with said at most one update transaction to define said new access block, storing said new relation version in said new database location, redefining as old the one of said plurality of relation versions then defined as current and defining said new relation version as current.

6. A method in accordance with claim 5 wherein said step of storing a plurality of versions of said relation comprises the steps of allocating a head block for each of said plurality of relation versions, storing each of said plurality of relation versions in at least one data block and for each of said plurality of relation versions, storing at least one index entry in the head block for that relation version, each of said index entries defining the database location of a data block storing a portion of that relation version and wherein said step of storing said new relation version in said new database location comprises the steps of allocating a head block for said new relation version, storing said new relation version in at least one data block and storing at least one index entry in the head block for said new relation version defining the database location of said at least one data block storing said new relation version.

7. A method in accordance with claim 6 in which each of the access blocks stored in said access dictionary defines the database location of a relation version by defining the database location of the head block for that relation version.

8. A method in accordance with claim 7 wherein said step of storing said new relation version in at least one data block comprises the steps of copying into a new data block a data block storing a portion of the one of said plurality of relation versions then defined as current, which portion is to be updated by said at most one update transaction and modifying said new data block.

9. A method in accordance with claim 8 further comprising the step of storing a data duplication control bit of a predetermined logic value in each index entry of the head block of the one of said plurality of relation versions then defined as current when that index entry defines a copied data block.

10. A method in accordance with claims 5, 6, 7, 8, or 9 further comprising including in each of the access blocks stored in said access dictionary a user count representing the number of said plurality of database transactions which access the relation version defined by that access block and deallocating each access block when the user count of the access block is reduced to zero only when that access block was stored prior to the storage of the access block defining the database location of the one of said plurality of relation versions then defined as current.

11. A method in accordance with claim 9 further comprising including in each of the access blocks stored in said access dictionary a user count representing the number of said plurality of database transactions which access the relation version defined by that access block, deallocating each access block when the user count of that access block is reduced to zero only when that access block was stored prior to the storage of the access block defining the database location of the one of said plurality of relation versions then defined as current, for a given deallocated access block, testing the data duplication control bit of each index entry of the head block defined by said given access block and of each index entry of the head block defined by the immediately previously stored allocated access block, deallocating a data block defined by a given index entry of said head block defined by said given access block when the data duplication control bit of said given index entry and the data duplication control bit of a corresponding index entry of said head block defined by said immediately previously stored allocated access block are both said predetermined logic value and storing a data duplication control bit of said predetermined logic value in said last-mentioned index entry whenever the data duplication control bit of said last-mentioned index entry is not said predetermined logic value and the data duplication control bit of said given index entry is said predetermined logic value and deallocating said head block defined by said given deallocated access block.

12. A method in accordance with claim 10 further comprising the step of permitting access to said relation in said database outside of a transaction via the access block defining the database location of the one of said plurality of relation versions then defined as current.

13. A method of controlling access by each of a plurality of contemporaneously active database transactions to a database comprising a plurality of relations, said method comprising the steps of for each of said plurality of relations, storing a plurality of versions of that relation representing modifications of that relation resulting from previously executed database transactions and at most one of said plurality of active database transactions, for each of said plurality of active database transactions, storing in a relation dictionary one relation block associated with that database transaction for each of said plurality of relations to be accessed by that database transaction, each relation block stored for a given relation defining one of the plurality of versions of said given relation and for each of said plurality of relations, permitting access by each of said plurality of active database transactions only to the one of the plurality of versions of the relation defined by the relation block associated with that database transaction for that relation.

14. A method of controlling access by each of a plurality of contemporaneously active database transactions to a database comprising a plurality of relations, said method comprising the steps of for each of said plurality of relations, storing a plurality of versions of that relation representing modifications of that relation resulting from previously executed database transactions and at most one of said plurality of active database transactions, storing in an access dictionary a plurality of access blocks each defining the database location of an associated one of the plurality of versions of one of said plurality of relations.

for each of said plurality of active database transactions, storing in a relation dictionary one relation block associated with that database transaction for each of said plurality of relations to be accessed by the database transaction, each relation block defining one of said plurality of access blocks and for each of said plurality of relations, permitting access by each of said plurality of active database transactions only to the one of the plurality of versions of that relation having its database location defined by the access block defined by the relation block associated with that database transaction for that relation.

15. A method of controlling access by each of a plurality of contemporaneously active database transactions to a database comprising a plurality of relations, said method comprising the steps of for each of said plurality of relations, storing a plurality of versions of that relation representing modifications of that relation resulting from previously executed database transactions and at most one of said plurality of active database transactions, storing in an access dictionary a plurality of access blocks each defining the database location of an associated one of the plurality of versions of one of said plurality of relations, storing in a dynamic dictionary one dynamic block for each of said plurality of relations, the dynamic block stored for each relation including an access block pointer defining one of said plurality of access blocks, for each of said plurality of active database transactions, storing in a relation dictionary one relation block associated with that database transaction for each of said plurality of relations to be accessed by that database transaction, each relation block defining one of said plurality of access blocks such that as each of said plurality of active database transactions is begun, the relation block stored for a given relation includes the access block pointer of the dynamic block for said given relation and for each of said plurality of relations, permitting access by each of said plurality of active database transactions only to the one of the plurality of versions of that relation having its database location defined by the access block defined by the relation block associated with that database transaction for that relation.

16. An arrangement for controlling access by each of a plurality of contemporaneously active database transactions to a relation in a database, said arrangement comprising means for storing a plurality of versions of said relation representing modifications of said relation resulting from previously executed database transactions and at most one of said plurality of active database transactions, relation dictionary means for storing a plurality of relation blocks each associated with one of said plurality of active database transactions and defining one of said plurality of relation versions and means for permitting access by each of said plurality of active database transactions only to the one of said plurality of relation versions defined by the relation block associated with that database transaction.

17. An arrangement for controlling access by each of a plurality of contemporaneously active database transactions to a relation in a database, said arrangement comprising means for storing a plurality of versions of said relation representing modifications of said relation resulting from previously executed database transactions and at most one of said plurality of active database transactions, access dictionary means for storing a plurality of access blocks each defining the database location of an associated one of said plurality of relation versions, relation dictionary means for storing a plurality of relation blocks each associated with one of said plurality of active database transactions and defining one of said plurality of access blocks and means for permitting access by each of said plurality of active database transactions only to the one of said plurality of relation versions having its database location defined by the access block defined by the relation block associated with that database transaction.

18. An arrangement for controlling access by each of a plurality of contemporaneously active database transactions to a relation in a database, said arrangement comprising means for storing a plurality of versions of said relation representing modifications of said relation resulting from previously executed database transactions and at most one of said plurality of active database transactions, access dictionary means for storing a plurality of access blocks each defining the database location of an associated one of said plurality of relation versions, means for defining one of said plurality of relation versions as current, relation dictionary means for storing a plurality of relation blocks each associated with one of said plurality of active database transactions and defining one of said plurality of access blocks such that as each of said plurality of active database transactions is begun a relation block associated with that database transaction is stored defining the one of said plurality of access blocks defining the database location of the one of said plurality of relation versions then defined as current, means for permitting access by each of said plurality of active database transactions only to the one of said plurality of relation versions having its database location defined by the access block defined by the relation block associated with that database transaction.

19. An arrangement in accordance with claims 16, 17, or 18 wherein said means for storing a plurality of versions of said relation further comprises means for allocating a head block for each of said plurality of relation versions, means for storing each of said plurality of relation versions in at least one data block and means for storing for each of said plurality of relation versions at least one index entry in the head block for that relation version, each of said index entries defining the database location of a data block storing a portion of that relation version.

20. In a program-controlled system having a database including at least one relation, an arrangement for assuring that the data of said relation that are accessible to each of a plurality of contemporaneously active database transactions are unchanged by any transaction other than said each transaction, said plurality of trasactions comprising sets of operations on said relation and comprising at most one update transaction including write access to said relation, said arrangement comprising means for storing a plurality of versions of said relation, access dictionary means for storing a plurality of access blocks each defining the database location of an associated one of said plurality of relation versions, means for defining one of said plurality of relation versions as current, relation dictionary means for storing a plurality of relation blocks each associated with one of said plurality of database transactions and defining one of said plurality of access blocks such that as each of said plurality of database transactions is begun a relation block associated with that database transaction is stored defining the one of said plurality of access blocks defining the database location of the one of said plurality of relation versions then defined as current, means for permitting access to said relation in said database by each of said plurality of database transactions only via the relation block associated with that database trasaction, means for storing for said at most one update transaction a new access block in said access dictionary means defining a new database location to be used for storing a new relation version, means for modifying the relation block associated with said at most one update transaction to define said new access block, means for storing said new relation version in said new database location, means for redefining as old the one of said plurality of relation versions then defined as current and means for defining said new relation version as current.

21. An arrangement in accordance with claim 20 wherein said means for storing a plurality of versions of said relation further comprises means for allocating a head block for each of said plurality of relation versions, means for storing each of said plurality of relation versions in at least one data block and means for storing for each of said plurality of relation versions at least one index entry in the head block for that relation version, each of said index entries defining the database location of a data block storing a portion of that relation version and wherein said means for storing said new relation version in said new database location further comprises means for allocating a head block for said new relation version, means for storing said new relation version in at least one data block and means for storing at least one index entry in the head block for said new relation version defining the database location of said at least one data block storing said new relation version.

22. An arrangement in accordance with claim 21 in which each of the access blocks stored in said access dictionary means defines the database location of a relation version by defining the database location of the head block for that relation version.

23. An arrangement in accordance with claim 22 wherein said means for storing said new relation version in at least one data block further comprises means for copying into a new data block a data block storing a portion of the one of said plurality of relation versions then defined as current, which portion is to be updated by said at most one update transaction and means for modifying said new data block.

24. An arrangement in accordance with claim 23 further comprising means for storing a data duplication control bit of a predetermined logic value in each index entry of the head block of the one of said plurality of relation versions then defined as current when that index entry defines a copied data block.

25. An arrangement in accordance with claims 20, 21, 22, 23 or 24 further comprising means for including in each of the access blocks stored in said access dictionary means a user count representing the number of said plurality of database transactions which access the relation version defined by that access block and means for deallocating each access block when the user count of that access block is reduced to zero only when that access block was stored prior to the storage of the access block defining the database location of the one of said plurality of relation versions then defined as current.

26. An arrangement in accordance with claim 24 further comprising means for including in each of the access blocks stored in said access dictionary means a user count representing the number of said plurality of database transactions which access the relation version defined by that access block, means for deallocating each access block when the user count of that access block is reduced to zero only when that access block was stored prior to the storage of the access block defining the database location of the one of said plurality of relation versions then defined as current, means for testing, for a given deallocated access block, the data duplication control bit of each index entry of the head block defined by said given access block and of each index entry of the head block defined by the immediately previously stored allocated access block, means for deallocating a data block defined by a given index entry of said head block defined by said given access block when the data duplication control bit of said given index entry and the data duplication control bit of a corresponding index entry of said head block defined by said immediately previously stored allocated across block are both said predetermined logic value, means for storing a data duplication control bit of said predetermined logic value in said last-mentioned index entry whenever the data duplication control bit of said last-mentioned index entry is not said predetermined logic value and the data duplication control bit of said given index entry is said predetermined logic value and means for deallocating said head block defined by said given deallocated access block.

27. An arrangement in accordance with claim 25 further comprising means for permitting access to said relation in said database outside of a transaction via the access block defining the database location of the one of said plurality of relation versions then defined as current.

28. An arrangement for controlling access by each of a plurality of contemporaneously active database transactions to a database comprising a plurality of relations, said arrangement comprising means for storing for each of said plurality of relations a plurality of versions of that relation representing modifications of that relation resulting from previously executed database transactions and at most one of said plurality of active database transactions, relation dictionary means for storing for each of said plurality of active database transactions one relation block associated with that database transaction for each of said plurality of relations to be accessed by that database transaction, each relation block stored for a given relation defining one of the plurality of versions of said given relation and means for permitting access, for each of said plurality of relations, by each of said plurality of active database transactions only to the one of the plurality of versions of that relation defined by the relation block associated with that database transaction for that relation.

29. An arrangement for controlling access by each of a plurality of contemporaneously active database transactions to a database comprising a plurality of relations, said arrangement comprising means for storing for each of said plurality of relations a plurality of versions of that relation representing modifications of that relation resulting from previously executed database transactions and at most one of said plurality of active database transactions, access dictionary means for storing a plurality of access blocks each defining the database location of an associated one of the plurality of versions of one of said plurality of relations, relation dictionary means for storing for each of said plurality of active database transactions one relation block associated with that database transaction for each of said plurality of relations to be accessed by that database transaction, each relation block defining one of said plurality of access blocks and means for permitting access, for each of said plurality of relations, by said plurality of active database transactions only to the one of the plurality of versions of that relation having its database location defined by the access block defined by the relation block associated with that database transaction for that relation.

30. An arrangement for each of a plurality of contemporaneously active database transactions to a database comprising a plurality of relations, said arrangement comprising means for storing for each of said plurality of relations a plurality of versions of that relation representing modifications of that relation resulting from previously executed database transactions and at most one of said plurality of active database transactions, access dictionary means for storing a plurality of access blocks and each defining the database location of an associated one of the plurality of versions of one of said plurality of relations, dynamic dictionary means for storing one dynamic block for each of said plurality of relations, and dynamic block stored for each relation including an access block pointer defining one of said plurality of access blocks, relation dictionary means for storing for each of said plurality of active database transactions one relation block associated with that database transaction for each of said plurality of relations to be accessed by that database transaction, each relation block defining one of said plurality of access blocks such that as each of said plurality of active database transactions is begun, the relation block stored for a given relation includes the access block pointer of the dynamic block for said given relation and means for permitting access, for each of said plurality of relations, by each of said plurality of active database transactions only to the one of said plurality of versions of that relation defined by the relation block associated with that database transaction for that relation.

31. In a program-controlled system having a database including at least one relation, a method of assuring that the data of said relation that are accessible to each of a plurality of contemporaneously active database transactions are unchanged by any transaction other than said each transaction, said plurality of transactions comprising sets of operations on said relation and comprising at most one update transaction including write access to said relation, said method comprising the steps of storing a plurality of versions of said relation, defining one of said plurality of relation versions as current, storing in a relation dictionary a plurality of relation blocks each associated with one of said plurality of database transactions and defining one of said relation versions such that as each of said plurality of database transactions is begun a relation block associated with that database transaction is stored defining the one of said plurality of relation versions then defined as current, permitting access to said relation in said database by each of said plurality of database transactions only via the relation block associated with that database transaction, for said at most one update transaction, modifying the relation block associated with that transaction to define a new relation version, storing said new relation version in said database, redefining as old the one of said plurality of relation versions then defined as current and defining said new relation version as current.

32. A method in accordance with claim 31 further comprising the step of deferring execution of a second update transaction including write access to said relation, until said at most one update transaction is completed.

33. In a program-controlled system having a database including at least one relation, an arrangement for assuring that the data of said relation that are accessible to each of a plurality of contemporaneously active database transactions are unchanged by any transaction other than said each transaction, said plurality of transactions comprising sets of operations on said relation and comprising at most one update transaction including write access to said relation, said arrangement comprising means for storing a plurality of versions of said relation, means for defining one of said plurality of relation versions as current, relation dictionary means for storing a plurality of relation blocks each associated with one of said plurality of database transactions and defining one of said relation versions such that as each of said plurality of database transactions is begun a relation block associated with that database transaction is stored defining the one of said plurality of relation versions then defined as current, means for permitting access to said relation in said database by each of said plurality of database transactions only via the relation block associated with that database transaction, means for modifying the relation block associated with said at most one update transaction to define a new relation version, means for storing said new relation version in said database, means for redefining as old the one of said plurality of relation versions then defined as current and means for defining said new relation version as current.

34. An arrangement in accordance with claim 33 further comprising means for deferring execution of a second update transaction including write access to said relation, until said at most one update transaction is completed.

* * * * *

UNITED STATES PATENT AND TRADEMARK OFFICE
CERTIFICATE OF CORRECTION

PATENT NO. : 4,627,019

DATED : December 2, 1986

INVENTOR(S) : Fred K. Ng

It is certified that error appears in the above-identified patent and that said Letters Patent is hereby corrected as shown below:

<u>IN THE CLAIMS</u>

Claim 1, Column 15, line 16, after "versions" insert --defined--;
Claim 2, Column 15, line 22, "verions" should be "versions";
Claim 2, Column 15, line 29, "relative" should be "relation";
Claim 14, Column 18, line 51, "the" should be "that";
Claim 20, Column 20, line 49 and 50, "trasactions" should be "transactions";
Claim 20, Column 21, line 7, "trasaction" should be "transaction";
Claim 26, Column 22, line 34, "across" should be "access";
Claim 30, Column 23, line 49, "and" should be "the".

Signed and Sealed this

Twenty-fifth Day of September, 1990

Attest:

HARRY F. MANBECK, JR.

*Attesting Officer*　　　　*Commissioner of Patents and Trademarks*